US011189295B2

(12) United States Patent
Farrar et al.

(10) Patent No.: US 11,189,295 B2
(45) Date of Patent: Nov. 30, 2021

(54) HIGH BANDWIDTH SONIC TONE GENERATION

(71) Applicant: LISNR, Inc., Cincinnati, OH (US)

(72) Inventors: Rebekah L. Farrar, Columbus, OH (US); Daniel Paul Prince, Cincinnati, OH (US); William Knauer, Erlanger, KY (US)

(73) Assignee: LISNR, Inc., Cincinnati, OH (US)

( * ) Notice: Subject to any disclaimer, the term of this patent is extended or adjusted under 35 U.S.C. 154(b) by 0 days.

(21) Appl. No.: 15/719,164

(22) Filed: Sep. 28, 2017

(65) Prior Publication Data

US 2019/0096412 A1    Mar. 28, 2019

(51) Int. Cl.
| | |
|---|---|
| *G06F 17/00* | (2019.01) |
| *G10L 19/018* | (2013.01) |
| *G10L 19/02* | (2013.01) |
| *H04B 11/00* | (2006.01) |

(52) U.S. Cl.
CPC ............ *G10L 19/018* (2013.01); *G10L 19/02* (2013.01); *H04B 11/00* (2013.01)

(58) Field of Classification Search
CPC ........ G10L 19/02; G10L 19/018; H04B 11/00
USPC .......................................................... 700/94
See application file for complete search history.

(56) References Cited

U.S. PATENT DOCUMENTS

| | | |
|---|---|---|
| 5,159,703 A | 10/1992 | Lowery |
| 5,335,250 A | 8/1994 | Dent et al. |
| 5,485,839 A | 1/1996 | Aida et al. |
| 5,565,921 A | 10/1996 | Sasaki et al. |
| 5,764,763 A * | 6/1998 | Jensen .................. H04H 20/31 380/241 |
| 5,889,870 A | 3/1999 | Norris |
| 5,923,252 A | 7/1999 | Sizer et al. |
| 5,995,512 A | 11/1999 | Pogue, Jr. |

(Continued)

FOREIGN PATENT DOCUMENTS

| | | |
|---|---|---|
| CN | 103 023 583 B | 4/2015 |
| EP | 1758308 A1 | 2/2007 |

(Continued)

OTHER PUBLICATIONS

Chirp Signal-Based Aerial Acoustic Communication for Smart Devices; Lee et al (Year: 2015).*

(Continued)

*Primary Examiner* — Paul C McCord
(74) *Attorney, Agent, or Firm* — Wood Herron & Evans LLP (57) ABSTRACT

A sonic signal encodes a symbol sequence representing a binary message, for delivery as audio content. The binary message into a sequence of symbols that are each associated with frequency characteristics transmitted over a time period. Two carriers are transmitted at two selected frequencies during each time period, delivering the binary data at a high rate. The symbol sequence is preceded by a prefix which takes the form of a sweeping frequency tone which sweeps over the frequency ranges of the carriers. Further, the amplitudes of the carriers are adjusted so that higher frequency transmissions are transmitted at higher sound pressure levels. Methods for synchronizing to the symbol sequence and decoding the symbol sequence are also described.

20 Claims, 7 Drawing Sheets

(56) References Cited

U.S. PATENT DOCUMENTS

| | | |
|---|---|---|
| 6,301,368 B1 | 10/2001 | Bolle et al. |
| 6,511,426 B1 | 1/2003 | Hossack et al. |
| 6,570,500 B1 | 5/2003 | Pieper |
| 6,664,913 B1 | 12/2003 | Craven et al. |
| 6,891,482 B2 | 5/2005 | Craven et al. |
| 6,912,319 B1 | 6/2005 | Barnes et al. |
| 6,947,893 B1 | 9/2005 | Iwaki et al. |
| 7,334,735 B1 | 2/2008 | Antebi et al. |
| 7,904,946 B1 | 3/2011 | Chu et al. |
| 7,995,197 B2 | 8/2011 | Sikora et al. |
| 8,140,331 B2 | 3/2012 | Lou |
| 8,401,569 B1 | 3/2013 | Bell et al. |
| 8,532,644 B2 | 9/2013 | Bell et al. |
| 8,544,753 B2 | 10/2013 | Antebi et al. |
| 8,711,656 B1 | 4/2014 | Paulson |
| 8,976,959 B2 | 3/2015 | Duplan et al. |
| 8,983,089 B1 | 3/2015 | Chu et al. |
| 8,989,779 B1 | 3/2015 | Centore, III |
| 9,024,998 B2 | 5/2015 | Chu et al. |
| 9,111,326 B1 | 8/2015 | Worley, III et al. |
| 9,213,969 B2 | 12/2015 | Arentz |
| 9,318,166 B2 | 4/2016 | Sharon et al. |
| 9,361,444 B2 | 6/2016 | Antebi et al. |
| 9,513,861 B2 | 12/2016 | Lin et al. |
| 9,766,702 B2 | 9/2017 | Cieplinski et al. |
| 9,912,415 B2 | 3/2018 | Tsfaty et al. |
| 10,044,448 B2 | 8/2018 | Mufti |
| 10,826,623 B2 | 11/2020 | Prince et al. |
| 2001/0049788 A1 | 12/2001 | Shur |
| 2002/0008615 A1 | 1/2002 | Heide et al. |
| 2002/0152045 A1 | 10/2002 | Dowling et al. |
| 2003/0206602 A1 | 11/2003 | Yamamoto |
| 2003/0217269 A1 | 11/2003 | Gantman et al. |
| 2004/0111360 A1 | 6/2004 | Albanese |
| 2005/0008325 A1 | 1/2005 | Ollis et al. |
| 2005/0171649 A1 | 8/2005 | Adachi |
| 2005/0177361 A1 | 8/2005 | Srinivasan |
| 2005/0190768 A1 | 9/2005 | Cutler |
| 2006/0041759 A1 | 2/2006 | Kaliski et al. |
| 2006/0136544 A1 | 6/2006 | Atsmon et al. |
| 2006/0138231 A1 | 6/2006 | Elberbaum |
| 2007/0153091 A1 | 7/2007 | Watlington et al. |
| 2007/0220544 A1 | 9/2007 | Nash-Putnam |
| 2007/0272750 A1 | 11/2007 | Bjorklund |
| 2008/0071537 A1 | 3/2008 | Tamir et al. |
| 2008/0134264 A1 | 6/2008 | Narendra et al. |
| 2008/0157938 A1 | 7/2008 | Sutardja |
| 2008/0165022 A1 | 7/2008 | Herz et al. |
| 2008/0173717 A1 | 7/2008 | Antebi et al. |
| 2008/0227436 A1 | 9/2008 | Gantman et al. |
| 2008/0228498 A1 | 9/2008 | Gasque |
| 2009/0019061 A1 | 1/2009 | Scannell, Jr. |
| 2009/0088133 A1 | 4/2009 | Orlassino |
| 2009/0210789 A1 | 8/2009 | Thakkar et al. |
| 2010/0034474 A1 | 2/2010 | Crucs |
| 2010/0053169 A1 | 3/2010 | Cook |
| 2010/0149022 A1 | 6/2010 | Fam et al. |
| 2010/0165879 A1 | 7/2010 | Gupta et al. |
| 2010/0280641 A1 | 11/2010 | Harkness et al. |
| 2010/0305449 A1 | 12/2010 | Wegener et al. |
| 2010/0331689 A1 | 12/2010 | Wegener |
| 2011/0029359 A1 | 2/2011 | Roeding et al. |
| 2011/0099295 A1 | 4/2011 | Wegener |
| 2011/0124399 A1 | 5/2011 | Dutilly et al. |
| 2011/0143677 A1 | 6/2011 | Jung et al. |
| 2011/0164595 A1 | 7/2011 | So et al. |
| 2011/0179182 A1 | 7/2011 | Vadla Ravnas |
| 2011/0295691 A1 | 12/2011 | Krieter |
| 2011/0301439 A1 | 12/2011 | Albert et al. |
| 2012/0051187 A1 | 3/2012 | Paulson |
| 2012/0064874 A1 | 3/2012 | Pierce, Jr. et al. |
| 2012/0084131 A1 | 4/2012 | Bergel et al. |
| 2012/0089461 A1 | 4/2012 | Greenspan |
| 2012/0134238 A1* | 5/2012 | Surprenant ............ H04S 1/007 367/137 |
| 2012/0179525 A1 | 7/2012 | Seguin et al. |
| 2012/0197738 A1 | 8/2012 | Wakabayashi |
| 2012/0209949 A1 | 8/2012 | Deliyannis et al. |
| 2012/0214416 A1* | 8/2012 | Kent ..................... H04W 4/21 455/41.2 |
| 2012/0232906 A1 | 9/2012 | Lindahl |
| 2012/0295560 A1 | 11/2012 | Mufti |
| 2013/0078988 A1 | 3/2013 | Bell et al. |
| 2013/0079057 A1 | 3/2013 | Bell et al. |
| 2013/0082850 A1 | 4/2013 | Takeshima |
| 2013/0106977 A1 | 5/2013 | Chu et al. |
| 2013/0176984 A1 | 7/2013 | Koezuka |
| 2013/0185137 A1 | 7/2013 | Shafi et al. |
| 2013/0262539 A1 | 10/2013 | Wegener |
| 2013/0273968 A1 | 10/2013 | Rhoads et al. |
| 2013/0279300 A1 | 10/2013 | Iwase et al. |
| 2014/0039654 A1 | 2/2014 | Akiyama et al. |
| 2014/0045586 A1 | 2/2014 | Allen et al. |
| 2014/0050321 A1* | 2/2014 | Albert ................... H04W 12/04 380/270 |
| 2014/0101738 A1 | 4/2014 | Sama |
| 2014/0129232 A1 | 5/2014 | Jones et al. |
| 2014/0140503 A1 | 5/2014 | Duplan et al. |
| 2014/0172141 A1 | 6/2014 | Mangold |
| 2014/0369527 A1 | 12/2014 | Baldwin |
| 2015/0113094 A1* | 4/2015 | Williams ............... G06F 3/165 709/217 |
| 2015/0297193 A1 | 10/2015 | Rothberg et al. |
| 2015/0309151 A1 | 10/2015 | Shibata et al. |
| 2016/0142157 A1 | 5/2016 | Jeong et al. |
| 2016/0373430 A1 | 12/2016 | Bhat et al. |
| 2017/0279542 A1 | 9/2017 | Knauer et al. |
| 2017/0279571 A1* | 9/2017 | Melodia ............... H04L 1/0003 |
| 2018/0167147 A1* | 6/2018 | Almada ................ H04B 11/00 |
| 2018/0329676 A1 | 11/2018 | Williams et al. |
| 2019/0096412 A1 | 3/2019 | Knauer et al. |
| 2019/0190621 A1 | 6/2019 | Prince et al. |
| 2019/0204409 A1 | 7/2019 | Booij et al. |
| 2019/0253101 A1* | 8/2019 | Kilian ................... H04B 1/713 |
| 2019/0268078 A1 | 8/2019 | Okunev et al. |

FOREIGN PATENT DOCUMENTS

| | | |
|---|---|---|
| EP | 2847984 A1 | 3/2015 |
| EP | 3207639 A1 | 8/2017 |
| EP | 3358811 A1 | 8/2018 |
| JP | 06-90296 A | 3/1994 |
| JP | 2001-320337 A | 11/2001 |
| JP | 2003-1744404 A | 6/2003 |
| JP | 2003-324491 A | 11/2003 |
| JP | 2007-164659 A | 6/2007 |
| JP | 2008-293393 A | 12/2008 |
| JP | 2011-141784 A | 7/2011 |
| JP | 2012-525655 A | 10/2012 |
| KR | 10-1136279 B1 | 4/2012 |
| RU | 2326495 C2 | 6/2008 |
| WO | 2002/45273 A2 | 6/2002 |
| WO | 2005/122483 A1 | 12/2005 |
| WO | 2013/129587 A1 | 9/2013 |
| WO | 2013/166158 A1 | 11/2013 |
| WO | 2014/069617 A1 | 5/2014 |
| WO | 2014/104284 A1 | 7/2014 |
| WO | 2016/061353 A1 | 4/2016 |
| WO | 2016/123047 A1 | 8/2016 |
| WO | 2019/067861 A1 | 4/2019 |

OTHER PUBLICATIONS

Min, G et al., "Performance Analysis of Different Phase Shift Keying Modulation Schemes in Aeronautical Channels", Jun. 2009.
Chitode, J.S. Communication Theory 2002 Technical Publications. Prune. 5-28. Sec 5-6 near 5-7 Source Coding Theorem Shannon's First Theorem). (Year: 2002).

* cited by examiner

| Carrier | Symbol Value | Frequency (Hz) | SPL Level |
|---|---|---|---|
| A | 000 | 12800 | Low |
| A | 001 | 13000 | |
| A | 011 | 13200 | |
| A | 010 | 13400 | |
| A | 110 | 13600 | |
| A | 111 | 13800 | |
| A | 101 | 14000 | |
| A | 100 | 14200 | |
| B | 000 | 14400 | |
| B | 001 | 14600 | |
| B | 011 | 14800 | |
| B | 010 | 15000 | |
| B | 110 | 15200 | Increasing Amplitude |
| B | 111 | 15400 | |
| B | 101 | 15600 | |
| B | 100 | 15800 | |
| C | 000 | 16000 | |
| C | 001 | 16200 | |
| C | 011 | 16400 | |
| C | 010 | 16600 | |
| C | 110 | 16800 | |
| C | 111 | 17000 | |
| C | 101 | 17200 | |
| C | 100 | 17400 | |
| D | 000 | 17600 | |
| D | 001 | 17800 | |
| D | 011 | 18000 | |
| D | 010 | 18200 | |
| D | 110 | 18400 | |
| D | 111 | 18600 | |
| D | 101 | 18800 | |
| D | 100 | 19000 | High |

| Symbol Period | Transmit Duration | Transmit Carriers | Bits |
|---|---|---|---|
| 1 | 20 msec | A+C | 6 |
|   | 20 msec | B+D | 6 |
| 2 | 20 msec | A+C | 6 |
|   | 20 msec | B+D | 6 |
| 3 | 20 msec | A+C | 6 |
|   | 20 msec | B+D | 6 |
| 4 | 20 msec | A+C | 6 |
|   | 20 msec | B+D | 6 |
| 5 | 20 msec | A+C | 6 |
|   | 20 msec | B+D | 6 |
| 6 | 20 msec | A+C | 6 |
|   | 20 msec | B+D | 6 |
| 7 | 20 msec | A+C | 6 |
|   | 20 msec | B+D | 6 |
| 8 | 20 msec | A+C | 6 |
|   | 20 msec | B+D | 6 |
| 9 | 20 msec | A+C | 6 |
|   | 20 msec | B+D | 6 |
| 10 | 20 msec | A+C | 6 |
|    | 20 msec | B+D | 6 |
| 11 | 20 msec | A+C | 6 |
|    | 20 msec | B+D | 6 |
| 12 | 20 msec | A+C | 6 |
|    | 20 msec | B+D | 6 |
| 13 | 20 msec | A+C | 6 |
|    | 20 msec | B+D | 6 |
| TOTAL | .52 sec | TOTAL | 15 |

FIG. 5B

| Symbol Period | Transmit Duration | Transmit Carriers | Bits |
|---|---|---|---|
| 1 | 20 msec | A+C | 6 |
|   | 20 msec | B+D | 6 |
| 2 | 20 msec | A+C | 6 |
|   | 20 msec | B+D | 6 |
| 3 | 20 msec | A+C | 6 |
|   | 20 msec | B+D | 6 |
| 4 | 20 msec | A+C | 6 |
|   | 20 msec | B+D | 6 |
| 5 | 20 msec | A+C | 6 |
|   | 20 msec | B+D | 6 |
| . . . . | | | |
| 21 | 20 msec | A+C | 6 |
|    | 20 msec | B+D | 6 |
| 22 | 20 msec | A+C | 6 |
|    | 20 msec | B+D | 6 |
| 23 | 20 msec | A+C | 6 |
|    | 20 msec | B+D | 6 |
| 24 | 20 msec | A+C | 6 |
|    | 20 msec | B+D | 6 |
| 25 | 20 msec | A+C | 6 |
|    | 20 msec | B+D | 6 |
| 26 | 20 msec | A+C | 6 |
|    | 20 msec | B+D | 6 |
| TOTAL | 1.04 sec | TOTAL | 312 |

FIG. 6

HIGH BANDWIDTH SONIC TONE GENERATION

CROSS REFERENCE TO RELATED APPLICATION

This application is related to PCT Application Serial No. US2013/039079 filed May 1, 2013, which was published in the United States on Apr. 23, 2015 as Publication US2015-0113094, and which claims benefit of US Provisional Patent Application Ser. Nos. 61/781,107 filed Mar. 14, 2013 and 61/640,900 filed May 1, 2012, each of which is incorporated herein by reference in its entirety.

This application is also related to PCT Application Serial No. US2015/055738 filed Oct. 15, 2015, which claims benefit of U.S. Provisional Patent Application Ser. No. 62/064,468 filed Oct. 15, 2014, which is incorporated herein in its entirety.

This application is also related to PCT Application Serial No. US2017/024025 filed Mar. 24, 2017, which claims benefit of U.S. patent application Ser. No. 15/081,158 filed Mar. 25, 2016, which is incorporated herein in its entirety.

TECHNICAL FIELD

This application generally relates to systems and methods for delivering transmitting information from a sending to a receiving device using one or more sonic signals transmitted by the sending device and received by the receiving device.

BACKGROUND OF THE INVENTION

Various proposals have been made to include sonic signaling tones into audio content that is broadcast or played back audibly in a public or private environment, or delivered electronically. The signaling tones are designed for reception and decoding by a decoding device, such as a portable multifunction device. For example, the sonic signal may be delivered embedded in audio content that is received by a microphone of the decoding device. The source of the signal may be any audio speaker within the proximity of the portable multifunction device, or the audio content may be supplied for decoding by an on-board audio generating application, such as music player module, or an on-board video player application, such as video player module, or provided to a line-out port (such as a headphone jack) of a decoding device, or provided to an external speaker of the decoding device.

Example systems and methods for embedding sonic signals into audio content are provided in the above-referenced Patent Applications, as well as the following US patent applications, the entirety of which applications is hereby incorporated by reference in their entirety: U.S. patent application Ser. No. 13/286,613 entitled "SYSTEM EFFECTIVE TO MODULATE A CODE AND PROVIDE CONTENT TO A USER" filed Nov. 1, 2011, U.S. patent application Ser. No. 13/286,670 entitled "SYSTEM EFFECTIVE TO DEMODULATE A MODULATED CODE AND PROVIDE CONTENT TO A USER" filed Sep. Nov. 1, 2011, and U.S. patent application Ser. No. 13/286,727 entitled "DEVICE EFFECTIVE TO MODULATE A CODE AND TO PROVIDE CONTENT TO A USER" filed Nov. 1, 2011.

Sonic signals, as described in these filings, are generally outside the range of human hearing or other signals not otherwise decipherable by humans. For example, in some embodiments, the sonic signal may be generated by frequencies above 20,000 Hz or less than 20 Hz, or in a frequency band near to 20,000 Hz or near to 20 Hz which is generally inaudible. The sonic signal may be the form of a modulated code, as described in the above-reference patent applications, which is a series of logic 0s and 1s. The modulated code may be repeatedly and periodically output by the sound source, enabling the decoding device to identify and demodulate the modulated code in the sonic signal to determine the logical series of 0s and 1s associated with the sonic signal. In some embodiments, the logical series of 0s and 1s may be, for example, a coded identifier which can be transmitted to a content management system via various communications protocols.

As used herein, the term sonic signal is used to broadly refer to any type of acoustic signal, code, frequency, waveform, or otherwise that may be transmitted by a source and detected by a decoding device. The sonic signal may be processed by the decoding device by a process or routine passively running on the decoding device.

The previously described systems for producing sonic signals have a number of limitations, specifically in the integrity of data transmission, and in the flexibility of the system to efficiently transmit relatively large amounts of data, and data of different volumes for different applications. Thus, there is a need for an improvement in the methods of formatting and transmitting sonic signals to allow for greater flexibility and functionality than has been previously available.

SUMMARY OF THE INVENTION

According to an embodiment, a device is configured to generate and transmit a sonic signal, which encodes a symbol sequence representing a binary message, for delivery as audio content. The device comprises an audio device and a processor. The processor is configured to encode the binary message into a sequence of symbols wherein each symbol is associated with a time period during which two different carriers are transmitting at two selected frequencies. The processor is further configured to generate audio samples of a digitized version of the sequence of symbols using the frequency characteristics associated with the symbols. The processor is further configured to control the audio device to generate and transmit the sonic signal, based on the audio samples.

According to a further embodiment, a device is configured to generate and transmit a sonic signal which encodes a symbol sequence representing a binary message, for delivery as audio content. The device comprises an audio device and a processor. The processor is configured to generate a swept frequency preamble followed by a sequence of symbols each including at least one carrier transmitting at a frequency selected from a plurality of frequencies. In the specifically disclosed embodiment, the swept frequency preamble sweeps over a frequency range including each frequency transmitted in the sequence of symbols. The processor is further configured to control the audio device to generate samples of a digitized version of the audio content including the sonic signal.

According to yet another embodiment, a device is configured to generate and transmit a sonic signal which encodes a symbol sequence representing a binary message, for delivery as audio content. The device comprises an audio device and a processor. The processor is configured to generate a sequence of symbols each including at least one carrier transmitting at a frequency selected from a plurality of frequencies. The sound pressure level of the carrier varies among the symbols, such that higher frequency transmissions are transmitted at a higher sound pressure level than other, lower frequency transmission. The processor is further configured to control the audio device to generate samples of a digitized version of the audio content including the sonic signal.

DETAILED DESCRIPTION OF THE INVENTION

Various non-limiting embodiments of the invention are described to provide an understanding of the principles of the structure, function, and use of the content delivery and management systems and processes disclosed herein. One or more examples of these non-limiting embodiments are illustrated in the accompanying drawings. Persons of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of this disclosure.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The embodiments disclosed herein are generally directed to beacon iteration formats used to transmit data in a sonic signaling tone, and the configuration of decoding devices to detect sonic signal tones that are thus transmitted. The decoding device may be configured to then supply, e.g. wirelessly, an indication of the sonic signal that was received to a content management system. Upon receipt of the indication of the received sonic signal from the decoding device, the content management system may provide particular content to the decoding device based on the particular sonic signal received, as is discussed in detail in the above-referenced prior patent filings.

In further embodiments, a first mobile device may interact directly with a second mobile device to exchange information using sonic signals, as described in further detail below.

Figure 1:
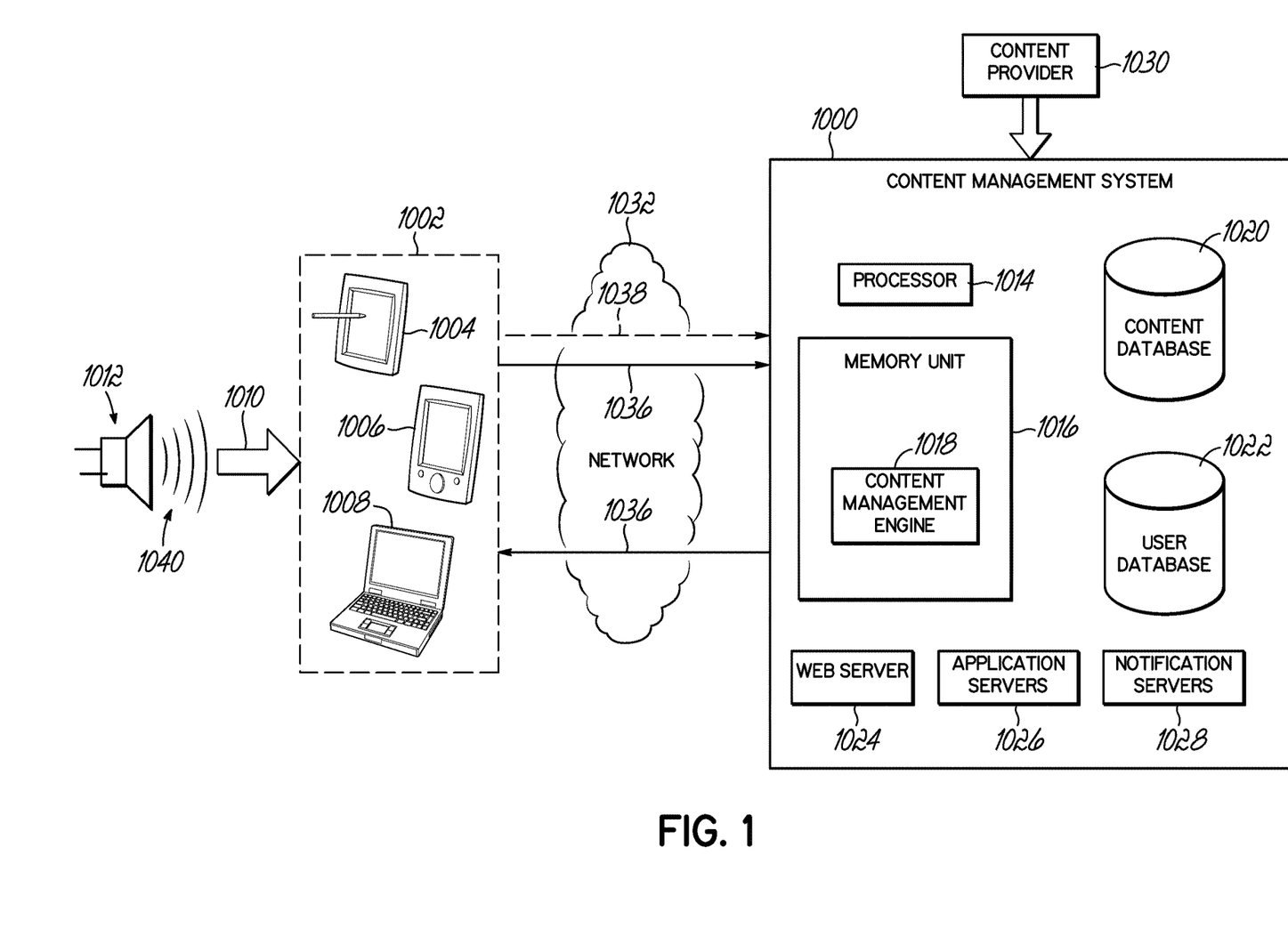
FIG. 1 is a schematic illustration of an example environment in which a mobile device receives content in the form of a sonic signal and further interacts with a content management system, according to an embodiment.

FIG. 1 illustrates one example embodiment of the present disclosure which comprises a content management system 1000 that receives and processes information affiliated with inaudible signals which has been decoded by decoding devices which, in this embodiment, are portable multifunction devices 1002. In this embodiment, the content management system 1000 may then determine which content to provide to users and then wirelessly provide the content to portable multifunction devices 1002 associated with the users. The content management system 1000 may be provided using any suitable processor-based device or system, such as a personal computer, laptop, server, mainframe, or a collection (e.g., network) of multiple computers, for example. The content management system 1000 may include one or more processors 1014 and one or more computer memory units 1016. For convenience, only one processor 1014 and only one memory unit 1016 are shown in FIG. 1. The processor 1014 may execute software instructions stored on the memory unit 1016. The processor 1014 may be implemented as an integrated circuit (IC) having one or multiple cores. The memory unit 1016 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example.

The content management system 1000 may be in communication with portable multifunction devices 1002 via an electronic communications network 1032, such as a packet-based communication network in which communication proceeds by the exchange of data packets 1036. The communications network may include a number of computer and/or data networks, including the Internet, LANs, WANs, GPRS networks, etc., and may comprise wired and/or wireless communication links. The portable multifunction devices 1002 that communicate with the content management system 1000 may be any type of client device suitable for communication over the network, such as a palmtop computer, personal computer, a laptop computer, or a netbook computer, for example. In some example embodiments, a user may communicate with the network via a portable multifunction device 1002 that is a combination handheld computer and mobile telephone, sometimes referred to as a smart phone. It can be appreciated that while certain embodiments may be described in connection with user communication via a smart phone or laptop by way of example, the communication may be implemented using other types of user equipment or wireless computing devices such as a mobile telephone, personal digital assistant (PDA), combination mobile telephone/PDA, handheld device, mobile unit, game device, messaging device, media player, or other suitable mobile communications devices.

The memory unit 1016 may store executable software and data for content management engine 1018. When the processor 1014 of the content management system 1000 executes the software of the content management engine 1018, the processor 1014 may be caused to perform the various operations of the content management system 1000. Operations may include, without limitation, receiving an indication of a sonic signal from a portable communication device 1002 (such as in the form of one or more data packets 1036 including a coded identifier 1038 extracted from the sonic signal, for example), identifying content associated with the coded identifier, receiving and analyzing supplemental information received in packet(s) 1036 from the portable communication device 1002, and sending content embedded in one or more packets 1036 to the portable communication device 1002 via the communication network 1032.

Data used by the content management engine 1018 may be from various sources, such as a content database 1020, which may be an electronic computer database, for example. The data stored in the content database 1020 may be stored in a non-volatile computer memory, such as a hard disk drive, a read only memory (e.g., a ROM IC), or other types of non-volatile memory. Also, the data of the content database 1020 may be stored on a remote electronic computer system, for example. The data in the content database 1020 may be, without limitation, video content, audio content, text-based content, and so forth. The items of content in the content database 1020 may be tied to a particular coded identifier, for example. In some embodiments, a content provider 1030 may use a web portal, application program interface (API), or other form of interface to provide and manage content of the content management system 1000. For example, a content provider 1030 may provide instructions to the content management system 1000 to send content "A", "B", and "C" to portable multifunction devices 1002 that supply a coded identifier "X".

User database 1022, which may be an electronic computer database, for example, may also provide content used by the content management engine 1018. The data stored in the user database 1022 may be stored in a non-volatile computer memory, such as a hard disk drive, a read only memory (e.g., a ROM IC), or other types of non-volatile memory. Also, the data of the user database 1022 may be stored on a remote electronic computer system, for example. Data stored in the user database 1022 may related to information regarding particular users of the content management system 1000, user preferences, user requirements to receive content, and so forth.

In various embodiments, a decoding device may detect the sonic signal through a generally passive detection process. In other words, a user of the decoding device does not necessarily have to routinely initiate or activate the detection process. Instead, the detection process may be a background routine that operates in the random access memory (RAM) of a decoding device, for example. The background routine may periodically, or at least routinely, query signals received or generated by various on-board components of the decoding device in order to detect if a sonic signal is present. These queries may be performed without additional input from the user. Components queried by the detection process may include, without limitation, on-board microphones, on-board speakers, and other audio output ports (such as a headphone output or a line level output, for example).

The sonic signal may be received by the decoding device from any suitable source. For example, the sonic signal may be embedded in audio content that is received by a microphone of the decoding device. In this regard, the source may be any audio speaker within the proximity of the decoding device. The audio content may also be supplied by an on-board audio generating application, such as music player module, or an on-board video player application, such as video player module, or provided to a line-out port (such as a headphone jack) or an external speaker of the decoding device.

Upon detecting a sonic signal, the decoding device may process the sonic signal to extract a coded identifier. The extraction process may be performed by the processor of the decoding device 1002 or may be performed by a remote server which is provided with the sonic signal in a sampled form. In some embodiments, a coded identifier is extracted from the sonic signal and the coded identifier 1038 may then be provided to content management system 1000 via communication network 1032. Supplemental information may also be provided to the content management system 1000 along with the coded identifier, such as a time/date data, accelerometer data, geographic data, demographic data, device data, owner data, and so forth. The format of the content may be binary, text, numeric, or any combination of these.

The content management system 1000 may process the received information to identify content to transmit to the decoding device. The content may be stored locally to the content management system or may be stored in data stores remote from the content management system. The content may be in any suitable file format or file type. A non-limiting and non-exhaustive list of example content that may be provided to a decoding device includes video-based content, audio-based content, image-based content, and text-based content.

Video-based content may include, without limitation, concert footage, music videos, artist interviews, movies, commercials and so forth. Audio-based content may include, without limitation, songs, ringtones, and so forth. Image-based content may include, without limitation, pictures, logos, wallpapers, and so forth. Text-based content may include, without limitation, lyrics, quotes, coupons, passwords, passcodes, email messages, text messages, instant messages, and so forth. In some embodiments, the content may be advertisements or educational in nature. This disclosure is not limited to any particular content which may be delivered to decoding devices associated with the content management system.

In various embodiments, the particular content delivered to a decoding device may be based on the coded identifier and one or more triggers. Over time additional content may be accessible (unlocked) as the decoding device, or user of the device, satisfies various thresholds. For example, the number of times a particular sonic signal has been received by the device may determine which content is sent to the device. If the sonic signal is embedded in a song, the number of times the sonic signal is received may indicate the number of times the song has been listened to by a user associated with the device. As the user listens to the song more and more, additional content ("unlocked content") may be delivered to that user's device.

Additional content may be labeled or otherwise considered as "exclusive" content that is only available to certain types or groups of listeners. For example, a sonic signal may be broadcast at a music venue while an artist is performing a concert. Audience members having devices passively detecting for sonic signals will receive and process the sonic signal. The device may then extract the coded identifier and provide the information to a content management system 1000 via a wireless communications network 1032. The content management system 1000 may match the coded identifier to stored content associated with the performing artist. The content may then be pushed to the decoding device 1002 that originally sent the coded identifier. The user will then be able to access the content via their decoding device. Thus, in the illustrated embodiment, the decoding device passively detected the sonic signal, extracted the coded identifier, transmitted the coded identifier and received affiliated content without any input or interaction from a user.

In some embodiments, the particular content delivered to a decoding device may be function of where the device is geographically located. In other words, decoding devices in a first city that passively detect a certain sonic signal may receive a first piece of content while decoding devices in a second city that detect the same sonic signal may receive a second piece of content. Additionally, the content delivered to the decoding device may depend on other triggers, such as whether the decoding device is moving (in a car), the time of day, user preferences, and so forth.

The content received by the decoding device may be stored, arranged, and viewed in any suitable configuration. The content may be viewed at the time of receipt or at a later point in time. In one embodiment, content is delivered to an electronic mailbox associated with the user. In one embodiment, content is delivered to an application or module that is executable by the decoding device. A user can execute the application and access the content. Content can be sorted in any suitable hierarchy or schema.

In some embodiments, "locked" content may be displayed to the user through the application. In order to unlock the content, the user must, for example, satisfy certain parameters or thresholds. The thresholds may relate to a total number of listens, a geographic location, and so forth. In any event, when content is received by the decoding device, a notification may be provided to the user by the decoding device. In one embodiment, upon receiving the notification, the user can then navigate the associated application to view the content received.

Sonic signals 1040 may, in one embodiment, be embedded in audio songs. The disclosure herein, however, is not so limited. In fact, the systems and methods described herein may be used across a wide variety of platforms and implementations. For example, the passive detection routines described herein can be used to detect sonic signals 1040 associated with television shows, commercials, movies, and the like. In some embodiments, the detection routines described herein can be used to detect stand-alone sonic signals 1040 that are not embedded in audio signals. Such stand-alone sonic signals may be transmitted in, for example, commerce/shopping environments, business environments, music venues, entertainment venues, or any other suitable environments or venues.

A decoding device may also be configured to transmit 1010 sonic signals 1040 using its on-board speaker 1012, for example. The sonic signal 1040 may be received and processed by other decoding devices 1002 positioned proximate the transmitting decoding device. Upon passively detecting the sonic signal and providing an indication of the sonic signal to a content management system, particular content can be delivered to the decoding device in accordance with the systems and methods described herein.

Figure 2:
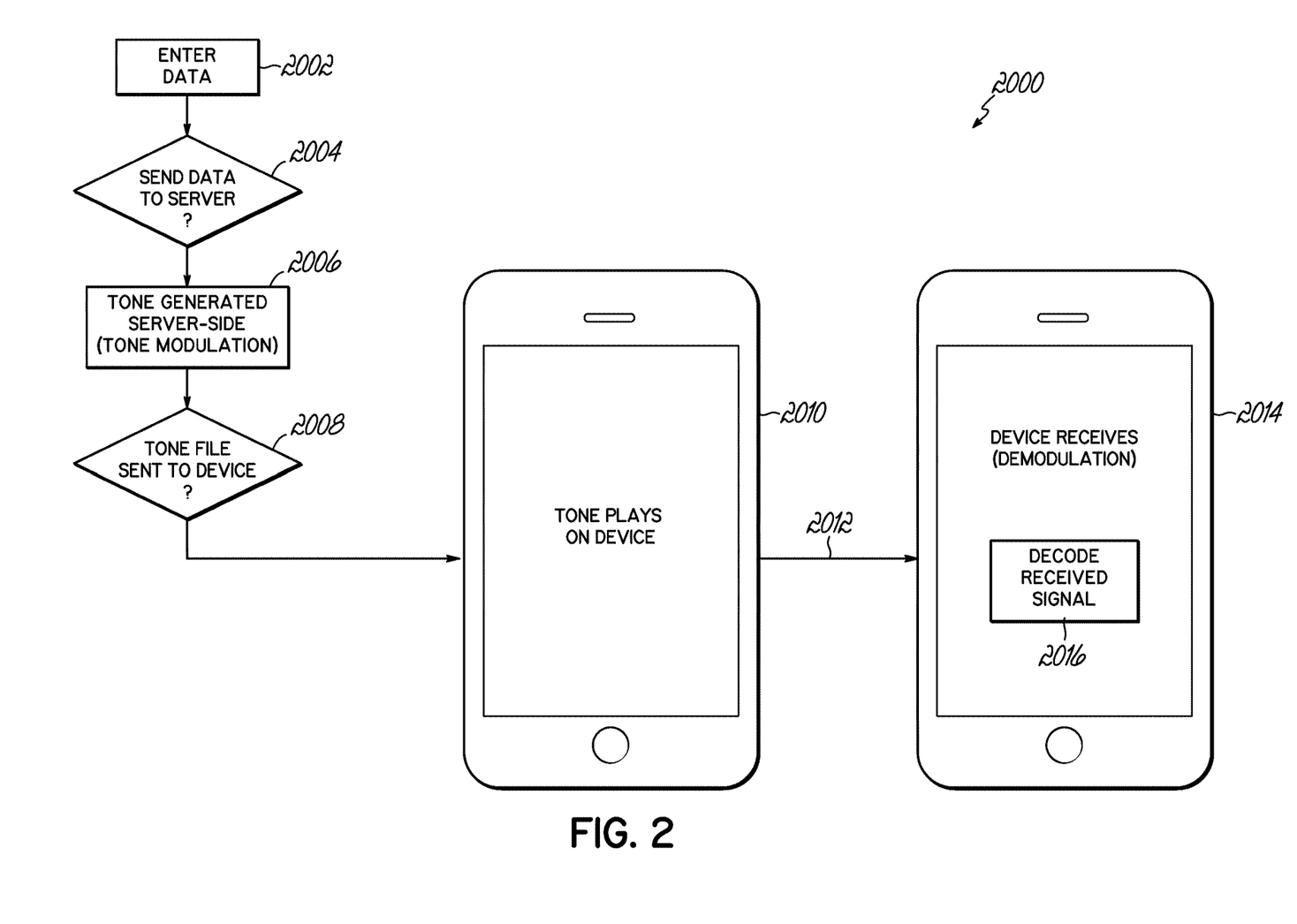
FIG. 2 is a schematic illustration of an example environment in which a sonic tone may be generated and passed to a mobile device using a server and a data connection, according to an embodiment.

It will be appreciated that the use of sonic tones need not involve the operation of a content management system. FIG. 2 illustrates a process by which a message or data may be delivered from one mobile device to another, encoded as a sonic tone or sequence of sonic tones. In the embodiment of FIG. 2 the sonic tones are generated by a server performing the appropriate modulation technique, and then the modulated sonic tone, described as a sequence of audio samples, is passed to a mobile device using a server and a data connection, according to an embodiment. In this example, in stage 2002, a user may enter data using a mobile or standalone device. In other embodiments, data to be modulated may be obtained from a server or storage device, either in real time or prior to the interaction. In stage 2004, the data may be sent to a modulating server. In stage 2006, the server may receive the data and use it to encode the message as a symbol sequence representing a binary message for delivery as audio content.

In this example, the binary message is encoded into a sequence of symbols wherein each symbol is associated with frequency characteristics. The server may then generate audio samples of a digitized version of the sequence of symbols using the frequency characteristics associated with the symbols. The audio samples may then be stored in memory for retrieval by the mobile device 2010 and/or transmitted to mobile device 2010. In some embodiments, the audio samples may be stored in a tone file.

In stage 2008 a tone file generated by the server is sent to device 2010. The tone file may be sent by a wired or wireless connection to device 2010. The first mobile device 2010 may then generate a sonic signal, based on the audio samples, and transmit 2012 the sonic signal, using an audio device associated with the first mobile device 2010.

According to an embodiment, the sonic signal that is generated and transmitted 2012 by the first mobile device 2010 may then be received by a second mobile device 2014. The second mobile device 2014 may receive the sonic signal using a microphone or other sonic signal detection device associated with the second mobile device 2014.

The second mobile device 2014 may then decode 2016 the sonic signal that is received from the first device 2010, as described in further detail below.

In the above-described embodiment, the audio samples are generated by the server and may be stored as a tone file. The tone file may then be sent to the first mobile device. In practice, however, the tone file may be so large that sending it to the first mobile device may not be practical. Therefore, it may be more efficient for the first mobile device 2010 to directly generate the audio samples rather than receiving them from the server. Accordingly, in a further embodiment, the first mobile device 2010 may generate the audio samples of the digitized version of the sequence of symbols representing the binary message based on information received by the first mobile device 2010 from the server. In this embodiment, the server may determine what information is to be used to generate the audio samples and may communicate this information to the first mobile device 2010. However, in this embodiment, the server does not generate the audio samples but these are generated in the first mobile device.

Figure 3:
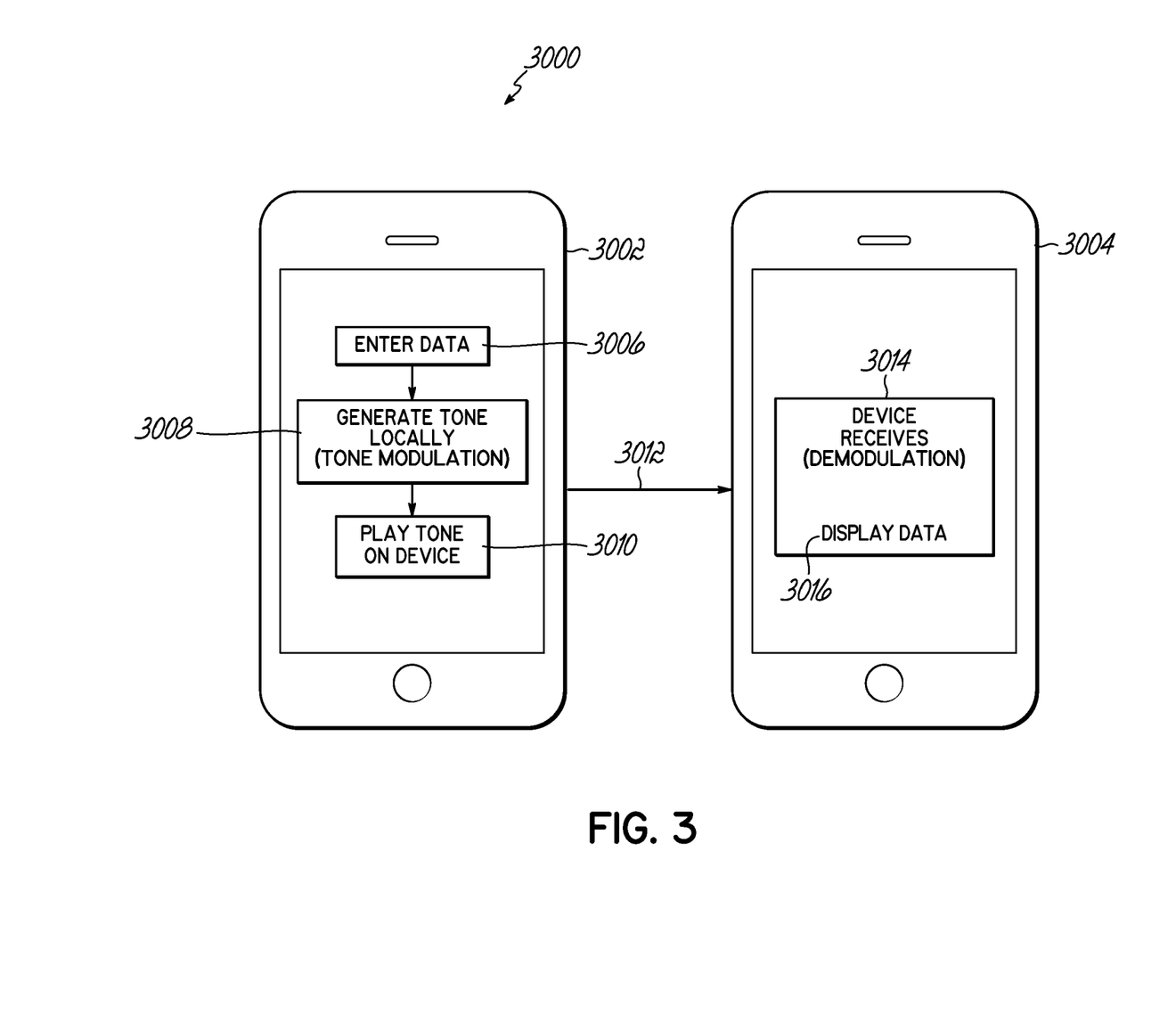
FIG. 3 is a schematic illustration of an example environment in which a sonic tone may be generated by a first mobile device and passed to a second mobile device, according to an embodiment.

FIG. 3 illustrates an embodiment 3000 in which a sonic tone may be generated by a first mobile device 3002 and passed to a second mobile device 3004, according to an embodiment. In this example, a first device 3002 may interact with a second device 3004 by sending and receiving messages encoded as sonic signals. In this example, in stage 3006, a user may enter data using a user interface that is provided by the first mobile device 3002, or obtain that data from a remote server or storage device.

According to the illustrated embodiment, the first device 3002 may use the data to encode a binary message into a sequence of symbols selected from a group consisting of two or more symbols, wherein each symbol is associated with frequency characteristics. In stage 3008, the first mobile device 3002 may then generate audio samples of a digitized version of the sequence of symbols using the frequency characteristics associated with the symbols. The audio samples may then be stored in memory and/or transmitted to the second mobile device 3004. In some embodiments, the audio samples may be stored in a tone file.

According to an embodiment, in stage 3010, the first mobile device 3002 plays back the generated audio samples, so that the sonic signal is broadcast 3012 for receipt by the second mobile device 3004, using an audio device associated with the first mobile device 3002.

According to an embodiment, the sonic signal that is generated 3008 and transmitted 3012 by the first mobile device 3002 may then be received by a second mobile device 3004. In stage 3014, the second mobile device 3004 may receive the sonic signal using a microphone or other sonic signal detection device associated with the second mobile device 3004. The second mobile device 3004 may then decode the sonic signal that is received from the first device 3002, as described in further detail below. According to an embodiment, in stage 3016, the second mobile device 3004 may display data associated with the received message. In further embodiments, the second mobile device 3004 may perform other operations based on the received message, as would be readily apparent to persons of ordinary skill in the art.

Figure 4:
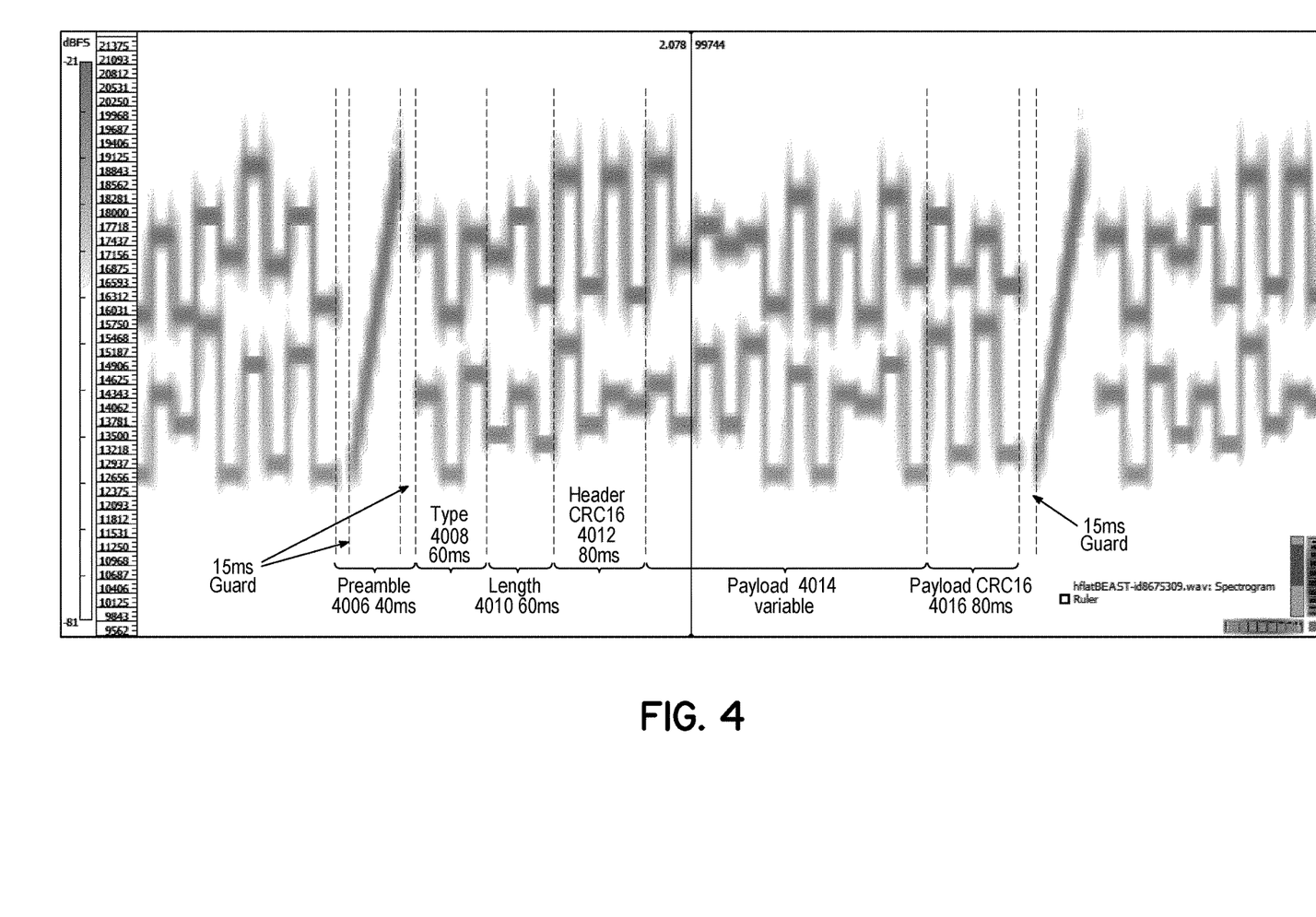
FIG. 4 provides a graphical representation of an example sonic signal that encodes a symbol sequence representing a binary message, according to an embodiment.
Figure 5:
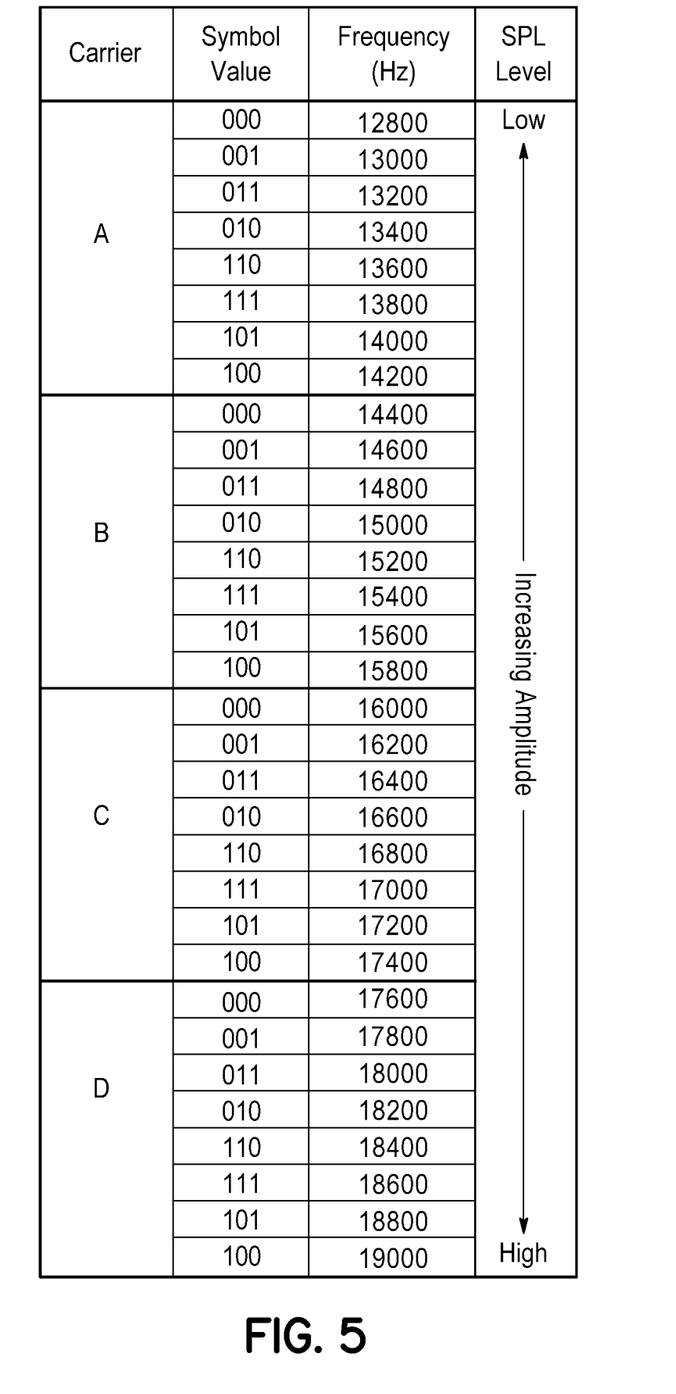
FIG. 5 is an index providing further details of the carriers and frequencies of those carriers, and corresponding SPL variations, used to encode symbols used in a sequence of the type illustrated in FIG. 4 according to an embodiment.

FIG. 4 provides a graphical representation 4000 of an example sonic signal 4002 that encodes a symbol sequence representing a binary message, according to an embodiment, and FIG. 5 provides an index to the encoding of the symbols used therein. The graphical representation 4000 is a plot of frequency vs. time of an example sonic signal 4002. In this representation, the vertical axis represents frequency that is divided into discrete bins 4004. Similarly, the horizontal axis represents time that is divided into discrete time samples.

According to an embodiment, a binary message is encoded as a sequence of symbols selected from a group consisting of two or more symbols, wherein each symbol is associated with frequency characteristics, transmitted during one of a sequence of symbol periods. Each symbol period has a duration of 40 msec, and each symbol is represented by the sequential transmission of four carrier frequencies, each of which is frequency shift keyed to one of eight discrete frequencies simultaneously transmitted during each symbol period.

In the illustrated embodiment, the four carrier frequencies are used for the transmission of symbols will be identified as carrier frequencies A, B, C and D. As seen in FIG. 5, carrier frequency A may modulate to one of eight frequency values between 12.8 kHz and 14.2 kHz, in 200 Hz steps, carrier frequency B may modulate to one of eight frequency values between 14.4 kHz and 15.8 kHz, in 200 Hz steps, carrier frequency C may modulate to one of eight frequency values between 16.0 kHz and 17.4 kHz, in 200 Hz steps, and carrier frequency D may modulate to one of eight frequency values between 17.6 kHz and 19.0 kHz, in 200 Hz steps.

As can be seen in FIG. 5, varying amplitudes are used with different frequencies of the carriers A, B, C, and D, with increasing amplitudes (and thus increasing sound pressure levels) being applied to higher frequency ranges, and a generally monotonic increase in amplitude and resulting sound pressure level as a function of increasing frequency. This has two advantages. First, the sound reproduction of typical loudspeakers often rolls off at higher frequencies, particular frequencies that are beyond the range of hearing of most listeners (such as, e.g., frequencies greater than 15 kHz). Accordingly, increasing amplitude with frequency works to compensate for reduced frequency response at higher frequencies. In addition, the lower amplitude and sound pressure level used at lower frequencies tends to mask the sonic tone in the range of hearing of a typical listener, thus reducing the audibility of the sonic tone and reducing the potential that the sonic tone will be an irritant to listeners. The range of increase of amplitude to be used is a function of the application to which the sonic tone is used, the expected loudspeakers and microphones to be employed, and the frequency ranges being employed, and thus any amplitude and sound pressure level variation which is generally monotonically increasing with increasing frequency should be considered as within the scope of the presently disclosed invention.

In use, selected frequencies of carriers A and C are transmitted together during a first 20 msec portion of the 40 msec symbol period and selected frequencies of carriers B and D are transmitted together during a second 20 msec portion of the 40 msec symbol period, such that each symbol period is characterized by a first portion with carriers A and C transmitting followed by a second portion with carriers B and D transmitting.

It will be appreciated that as each carrier can modulate to one of eight frequencies, the exact frequency of a carrier represents one of eight possible values, or three bits of data. Notably, a Gray coding scheme is used so that there is a minimum Hamming distance of one between adjacent codes used on adjacent frequencies; this is done so that an error of frequency identification during decoding, such as caused by Doppler shift changing the transmitted frequency to an adjacent frequency, yields a single bit error in the output rather than multiple bit errors.

The two carriers transmitted together during the first 20 msec portion of a symbol period may have one of 64 possible combinations of frequencies, representing 6 bits of data. The two carriers transmitted together during second 20 msec portion of the symbol period may have one of another 64 possible combinations of frequencies, representing another 6 bits of data, so that the combination of both transmissions during the 40 msec symbol period has one of 4028 possible combinations of frequencies, representing a 12-bit value.

Figure 5A:
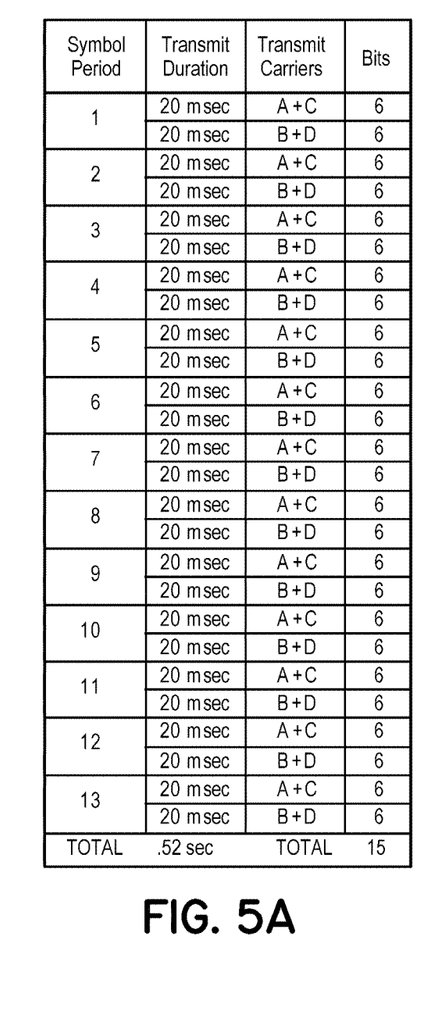
FIGS. 5A and 5B are exemplary presentations of the content in sonic transmissions of 13 and 26 symbols, respectively.
Figure 5B:
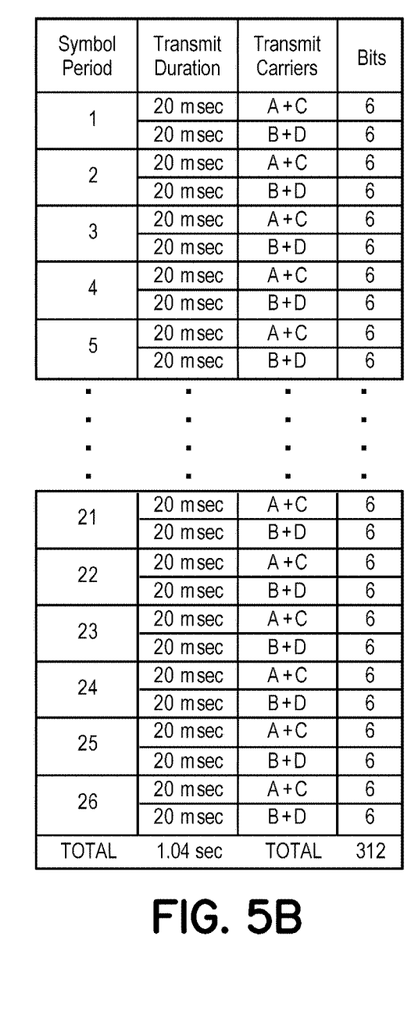

FIG. 5A illustrates an exemplary payload of a sonic transmission comprising 13 symbols transmitted over 13 40 msec symbol periods and totaling 0.52 seconds of transmission time and 156 transmitted bits. As can be seen, 6 bits of information are transmitted every 20 msec by the frequency modulation of two carriers, alternating between carriers A+C and carriers B+D. FIG. 5B illustrates an exemplary payload of a sonic transmission comprising 26 symbols transmitted over 26 40 msec symbol period totaling 1.04 second of transmission time and 312 transmitted bits.

It will be noted that in the embodiment illustrated and elaborated below, the payload of a transmission includes symbols representing the transmitted data in conjunction with additional symbols encoding a CRC value of the transmitted data; in the illustrated example the CRC value increases the bit rate by a factor of 1.5, such that the resulting transmission rate of the payload and associated check symbols is reduced to 8 bits per symbol.

Returning to FIG. 4, the fields that comprise the sonic signal 4002 are illustrated schematically below the signal 4002. The symbol sequence includes symbols representing a swept frequency preamble 4006, symbols representing a message type 4008, symbols representing a length 4010 of the message, symbols representing a cyclic redundancy check 4012 of the previous two fields, symbols representing a cyclic redundancy check 4014 of the upcoming payload, and symbols representing the payload data 4016. According to an embodiment, the payload may be of variable length, wherein the number of symbols associated with the payload 4016 is designated by the length field 4010. Further details of the symbol sequence format, according to an embodiment, are provided below.

According to an embodiment, the frequency preamble 4006 is delivered in a swept format, that is, the preamble comprises 40 msecs during which a modulating or sweeping frequency sonic signal is produced, where that frequency sweeps from the lowest to the highest frequency used by the carriers A, B, C and D in data transmission. An exemplary swept frequency preamble is seen in FIG. 4; this swept frequency preamble format includes 15 msec of silence, followed by a 40 msec long frequency sweep followed by 15 msec of silence, for a total length of 70 msec.

A swept frequency preamble 4006 such as is illustrated has been found to be more readily identified for the purposes of synchronization and decoding than was experienced with prior preamble formats (such as those in the above-referenced prior paten filings) which use stepped frequency sequences. For example, stepped frequency sequences were found to correlate (incorrectly) to other portions of sonic tone transmissions or to background noise at an unacceptably high rate. A swept frequency preamble reduced the number of false positive correlations dramatically.

The improvement in synchronization achieved using a swept frequency preamble seem to be independent of the pattern or type of frequency sweep used; whenever the swept frequency extends across the entire frequency range used for symbol transmission, regardless of the particular format of sweep elected for a particular implementation, effective synchronization was realized. Thus, the use of swept frequencies of all patterns and forms should be considered as within the scope of the present invention, not limited to the particular frequency sweep illustrated herein.

Further details on the method of synchronization to the preamble and subsequent decoding of the remainder of a sonic tone are elaborated below.

Following the swept preamble 4006, the remainder of the sonic tone comprises a series of 20 msec bursts of selected frequencies of carriers A, B, C and D. The first three 20 msec sections 4008 encode an 18-bit value (three 6 bit values) representing the transmission type (12 bits expanded to 18 after error correction), the next three 20 msec sections 4010 encode an 18-bit value representing the payload length (12 bits expanded to 18 after error correction). Following thereafter are four 20 msec sections encoding 24 bits of binary data which represent the CRC16 code for the type and length data. This is followed by the payload data 4014 and the payload CRC code 4016; in the illustrated case the payload data 4014 comprises 12 40 msec sections encoding 72 bits representing the payload (48 bits expanded to 72 after error correction), and the CRC code 4016 which comprises 4 40 msec sections encoding 24 bits representing the payload CRC. Each of fields 4008, 4010, 4012, 4014 and 4016 encode binary data using carriers A, B, C, D to convey the relevant information in symbols comprised of two 40 msec sections, each of which are decoded into 6 bits of binary information.

The use of the fields is as follows: field 4008 provides a binary value that identifies an encoding type used by the sonic tone 4000, which enables future modification of the encoding method of the sonic tone 4000 while maintaining reverse compatibility. The length field 4010 indicates the length of the beacon payload. The header cyclic redundancy check field provides redundancy for the header type field 4008 and header length field 4010.

Convolutional error correction coding is used in conjunction with a Viterbi decoder at the receiver to correct for possible corruption of the signal in transmission and reduce the likelihood of the received data being corrupted. The CRC data included in the bit stream is separately used to check the integrity of the decoded data following the Viterbi decoder to indicate whether the received data is likely corrupted or not. The result is a high level of data integrity, which is important to this format particularly because inaccurate payload length information can cause the erroneous loss of many beacon payloads.

Figure 6:
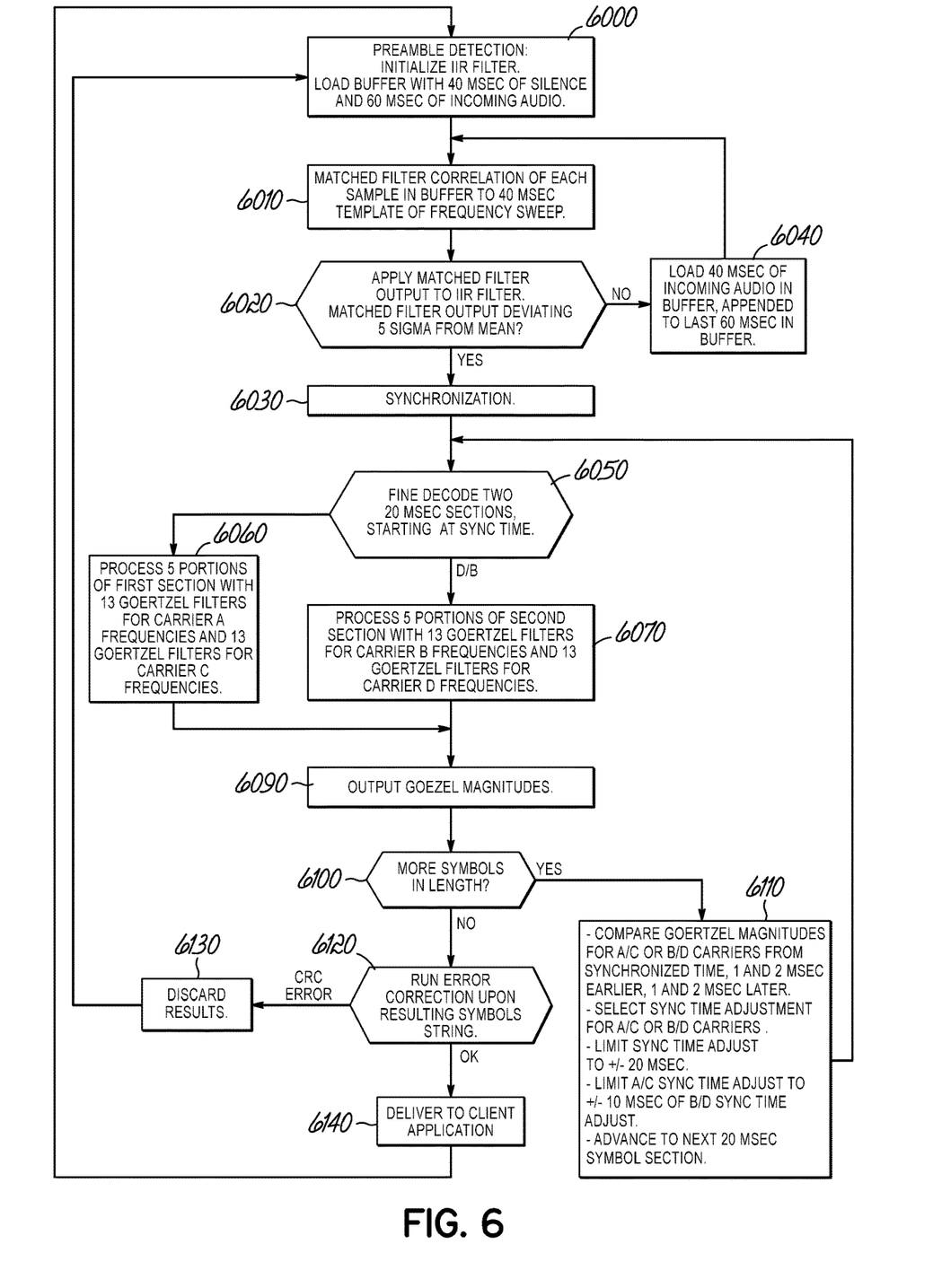
FIG. 6 is a flow chart of a decoding process for reception, synchronization and decoding of a sonic tone using the format illustrated in FIGS. 4 and 5.

Turning now to FIG. 6, a decoding process that may be used by a processor to decode symbols from an audio stream can be explained. This process begins with detection of the tone preamble and initialization in step 6000. Specifically, a buffer and infinite impulse response (IIR) filter are initialized; the buffer contains 100 msec of audio samples and is preloaded with 40 msec of silence and 60 msec of incoming audio samples. At the same time the infinite impulse response is initialized with zero values.

The filter is used to establish the correlation of extant background ambient noise to the swept preamble, in order to identify and discriminate the swept preamble from background noise.

After the initialization, in step 6010 a matched filter correlation is performed using a 40 msec audio sample template for the swept preamble to be detected. This correlation is performed across the entire input buffer in one-sample increments, to identify the 40 msec sequence of audio samples having the greatest correlation to the template.

In step 6020 the correlations developed by the matched filter are input to the IIR filter. The IIR filter is used to measure statistics about recent correlation measurements to indicate when a statistically significant variation has occurred. Specifically, IIR filter output is evaluated to determine if the measured greatest correlation is more than 5 standard deviations from the mean value developed by the IIR filter. If so, then the preamble is deemed found, and in step 6030 synchronized processing begins, using the identified location of the preamble, so that subsequent steps can process the symbols after the preamble. If, however, the preamble has not been found, then in step 6040 the buffer is loaded with 40 msec of incoming audio samples, which are appended to the last 60 msec of samples in the buffer, and the process returns to step 6010 to use the matched filter to search for the preamble in the updated buffer.

Once the preamble has been found, then in step 6050 a fine decoding process is performed. Specifically, two sequential 20 msec sections of the buffer are analyzed in detail to determine the frequencies appearing therein. Assuming synchronization, the first 20 msec section should contain frequencies of carriers A and C and the second 20 msec section should contain frequencies of carriers B and D.

The two sections are fine decoded in steps 6060 and 6070; in step 6060 the first 20 msec section is processed, and in step 6070 the second 20 msec portion is processed. In each of steps 6060 and 6070, 5 overlapping 20 msec portions are processed. The first portion is from 2 msec before the expected symbol start time to 18 msec after the expected symbol start time. The second portion is from 1 msec before the expected symbol start time to 19 msec after the expected symbol start time, the third portion is from the expected symbol start time to 20 msec after the expected symbol start time, the fourth portion is from 1 msec after the expected symbol start time to 21 msec after the expected symbol start time and the fifth portion is from 2 msec after the expected symbol start time to 22 msec after the expected symbol start time.

The best aligned of these five portions should include selected frequencies of the expected carriers, with very little bleed of carrier signals from preceding or succeeding symbols. Other portions which are less well aligned will exhibit less of the expected carriers and more stray signal from the other carriers.

To identify which carrier frequencies are present in each of the five portions, and to determine which portion is best aligned with the symbol start and end, each of the five portions is passed through a set of Goertzel filters, one Goertzel filter tuned to each of the possible frequencies of the carriers expected to appear in the portion. Each portion is evaluated in subsections: specifically, 13 overlapping subsections of each portion are passed through the set of Goertzel filters tuned to each of the possible frequencies of carriers A and C. The outputs of the Goertzel filter passes applied to each of the five portions are output to storage for the current symbol section, and processing continues.

In step 6090 the arrays of Goertzel magnitudes produced by steps 6060 and 6070 (13 Goertzel magnitudes for each expected frequency, for each of two carriers, for each of five portions of each of two 20 msec sections) are output to storage for later evaluation.

In step 6100 the length parameter for the sonic tone is evaluated to determine if additional symbols are expected in the sonic tone. If so, then a synchronization process is performed in step 6110, and then processing continues to step 6050 to process the next 40 msec of the buffered audio (as two 20 msec sections).

In step 6110, the synchronization is evaluated by comparing the Goertzel filter output magnitudes obtained for each the five overlapping portions of each of the two 20 msec sections. Specifically, the Goertzel filter outputs for the portion that begins at the expected start of the symbol as well as the portions that begin 2 and 1 msec earlier, and the portions that begin 2 and 1 msec later are compared. The synchronization process evaluates, for each of the five portions taken from a 20 msec section, the difference between the largest two Goertzel filter outputs, and if this largest difference is not found in the portion that begins at the expected start of the symbol, then the synchronization time is adjusted forward or backward by 1 or 2 msec to the timing where the largest difference was found. However, the accumulated synchronization time adjustment that may occur with this step is limited to +/−20 msec. The synchronization time adjustment is determined independently for the first and second 20 msec sections, and thus may be different for the section including carriers A+C and the section including carriers B+D (two carriers are evaluated for each 20 msec section of audio, as noted above), however, the adjustment for A+C carriers may not deviate more than +/−10 msec from the adjustment for the B+D carriers.

When the last symbol is processed through step 6100, then processing proceeds from step 6100 to step 6120, in which Viterbi decoding is performed for the string of symbol values and filter outputs gathered during the previous steps. The result is checked for integrity using the CRC information. If the result is in error, then in step 6130 the results are discarded and processing returns to step 6000 to attempt to detect the preamble of a new sonic tone. If, however, error correction is successful, then in step 6140 the payload is delivered to the client application, and then processing returns to step 6000 to attempt to detect the preamble of a new sonic tone.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium.

The operation and behavior of the embodiments may be described without specific reference to specific software code or specialized hardware components. The absence of such specific references is feasible, because it is clearly understood that artisans of ordinary skill would be able to design software and control hardware to implement the embodiments based on the specification with no more than reasonable effort and without undue experimentation.

Moreover, the processes associated with the disclosed embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network.

Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions.

It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed:

1. A device configured to generate and transmit a sonic signal that encodes a symbol sequence representing a binary message for delivery as audio content, the device comprising:
    an audio device; and
    a processor configured to perform the following operations:
        encoding the binary message into a sequence of symbols wherein each symbol is associated with a time period, and the transmission of at least one audio carrier at a fixed selected frequency during that time period, wherein a time period of at least one symbol is characterized by the simultaneous transmission of at least two carriers at two different fixed selected frequencies, wherein the frequencies of the two carriers are selected from a group comprising at least four frequencies;
        generating audio samples of a digitized version of a prefix, followed by the sequence of symbols using the fixed frequency characteristics associated with the symbols; and
        controlling the audio device to generate and transmit the sonic signal, based on the audio samples.

2. The device of claim 1, wherein the encoding comprises the use of one or more of forward error correction and redundancy coding.

3. The device of claim 1, wherein the symbol sequence further comprises:
    symbols representing a length of the symbol sequence;
    symbols representing redundancy coding; and
    symbols representing the binary message.

4. The device of claim 1 wherein symbols encode binary data values, wherein each binary data value is associated with respective frequency characteristics of a carrier transmitted during the symbol.

5. The device of claim 3, wherein the prefix comprises a single sweeping frequency tone.

6. A device configured to generate and transmit a sonic signal that encodes a symbol sequence representing a binary message for delivery as audio content, the device comprising:
    an audio device; and
    a processor configured to perform the following operations:
        encoding the binary message into a sequence of symbols wherein each symbol is associated with a time period, and the transmission of at least one audio carrier at a fixed selected frequency during that time period, wherein a time period of at least one symbol is characterized by the simultaneous transmission of at least two carriers at two different fixed selected frequencies, wherein the frequencies of the two carriers are selected from a group comprising at least four frequencies, and the symbols are preceded by a prefix;
        generating audio samples of a digitized version of the sequence of symbols using the frequency characteristics associated with the symbols; and
        controlling the audio device to generate and transmit the sonic signal, based on the audio samples.

7. The device of claim 5, wherein the encoding comprises the use of one or more of forward error correction and redundancy coding.

8. The device of claim 5, wherein the symbol sequence further comprises:
    symbols representing a length of the symbol sequence;
    symbols representing redundancy coding; and
    symbols representing the binary message.

9. The device of claim 5 wherein symbols encode binary data values, wherein each binary data value is associated with respective frequency characteristics of a carrier transmitted during the symbol.

10. The device of claim 9, wherein the prefix comprises a sweeping frequency tone that sweeps over a frequency range including each frequency of the carrier that is associated with a binary data value.

11. A processor implemented method of generating and transmitting a sonic signal that encodes a symbol sequence representing a data message for delivery as audio content, the method comprising:
    encoding, by a processor circuit, the data message into a sequence of symbols wherein each symbol is associated with a time period, and the transmission of at least one audio carrier at a selected frequency during that time period, wherein a time period of at least one symbol is characterized by the simultaneous transmission of at least two carriers at two different selected frequencies, wherein the frequencies of the two carriers are selected from a group comprising at least four frequencies;
    generating, by the processor circuit, audio samples of a digitized version of a prefix, followed by the sequence of symbols using the frequency characteristics associated with the symbols; and
    controlling, by the processor circuit, the audio device to generate and transmit the sonic signal, based on the audio samples.

12. The method of claim 11, further comprising:
encoding, by the processor circuit, the data message using of one or more of forward error correction and redundancy coding.

13. The method of claim 11, further comprising:
encoding, by the processor circuit, the data message as a symbol sequence comprising:
symbols representing a length of the symbol sequence;
symbols representing redundancy coding; and
symbols representing the binary message.

14. The method of claim 11, further comprising:
encoding, by the processor circuit, the data message as a symbol sequence,
wherein symbols encode binary data values, and
wherein each binary data value is associated with respective frequency characteristics of a carrier transmitted during the symbol.

15. The method of claim 13, further comprising:
controlling, by the processor circuit, audio device to generate and transmit the sonic signal having sound pressure level of the carriers that varies such that higher selected frequencies are transmitted at higher sound pressure levels than lower selected frequencies.

16. A processor implemented method of receiving and decoding a sonic signal that encodes a symbol sequence representing a data message received as audio content, the method comprising:
controlling, by a processor circuit, the audio receiver to receive samples of a digitized version of the sonic signal, into the processor circuit;
preforming, by the processor circuit, correlation of the sonic signal with an infinite impulse response filter to discriminate background noise from sweeping frequency characteristics associated with a preamble of a sonic signal;
performing, by the processor circuit, correlation with a matched filter to determine samples of the digitized version of the sonic signal corresponding to the preamble;
performing, by the processor circuit, correlation with a band pass filter to determine carrier frequencies of the sonic signal;
decoding, by the processor circuit, the data message as a sequence of symbols based on detection of at least two carriers at simultaneously transmitted at two different determined frequencies during a time period associated with each symbol, wherein the frequencies of the two carriers are selected from a group comprising at least four frequencies.

17. The device of claim 16, wherein the processor circuit is further configured to preform error correction on the data message using of one or more of forward error correction and redundancy coding.

18. The device of claim 16, wherein the processor circuit is further configured to decode the data message as a symbol sequence comprising:
symbols representing a length of the symbol sequence;
symbols representing redundancy coding; and
symbols representing the binary message.

19. The device of claim 16, wherein the processor circuit is further configured to decode the data message as a symbol sequence,
wherein symbols encode binary data values, and
wherein each binary data value is associated with respective frequency characteristics of a carrier transmitted during the symbol.

20. The device of claim 18, wherein the processor circuit is further configured to perform correlation with a Goertzel filter to determine carrier frequencies of the sonic signal to decode the data message as a symbol sequence.

* * * * *